United States Patent
D'Ercoli et al.

(10) Patent No.: US 11,200,633 B2
(45) Date of Patent: Dec. 14, 2021

(54) SYSTEMS AND METHODS FOR WATERMARKING DIGITAL IMAGES

(71) Applicant: Datalogic IP Tech, S.r.l., Bologna (IT)

(72) Inventors: Francesco D'Ercoli, Bologna (IT); Simone Cilli, Bologna (IT); Marco Cumoli, Monte San Pietro (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 295 days.

(21) Appl. No.: 15/666,476

(22) Filed: Aug. 1, 2017

(65) Prior Publication Data
US 2019/0043149 A1    Feb. 7, 2019

(51) Int. Cl.
*H04L 9/32* (2006.01)
*G06T 1/00* (2006.01)
*G06T 7/00* (2017.01)

(52) U.S. Cl.
CPC ............ *G06T 1/005* (2013.01); *G06T 1/0028* (2013.01); *G06T 1/0042* (2013.01); *G06T 1/0071* (2013.01); *G06T 7/0008* (2013.01); *G06T 2201/0065* (2013.01); *G06T 2201/0083* (2013.01)

(58) Field of Classification Search
CPC ..... G06T 1/005; G06T 1/0071; G06T 1/0028; G06T 1/0042; G06T 2201/0083; G06T 2201/0065
See application file for complete search history.

(56) References Cited

U.S. PATENT DOCUMENTS

| | | | |
|---|---|---|---|
| 8,588,461 B2* | 11/2013 | Webb | H04N 1/32235 |
| | | | 382/100 |
| 9,323,902 B2* | 4/2016 | Petrovic | H04N 1/00846 |
| 2011/0282860 A1* | 11/2011 | Baarman | G06F 16/951 |
| | | | 707/709 |

(Continued)

OTHER PUBLICATIONS

Chainani, R., et al., "A Review on Digital Watermarking For Copyright Protection of Digital Data," IJICSE, vol. 2, Issue 3, Jul.-Aug. 2015, 4 pages.

(Continued)

*Primary Examiner* — Fatoumata Traore
*Assistant Examiner* — Carlton Johnson
(74) *Attorney, Agent, or Firm* — Cozen O'Connor

(57) ABSTRACT

Systems and methods for applying and detecting cross dependent marks incorporated into an electronic or digital image to form a watermark. The electronic or digital image may include encoded information for example a machine-readable symbol. The watermarking may include an encoding and insertion sub-process that inserts one or more marks into an image at a first point in time for form a marked image, an extraction sub-process that extracts the marks at a second point in time, and a detection sub-process 108 that determines if any modifications have been made to the marked image. The marked image may be formed by determining a first original descriptor and first original mark within the image, determining a second original descriptor and second original mark within the image, and incorporating the first original mark into the second original descriptor and incorporating the second original mark into the first original descriptor.

21 Claims, 7 Drawing Sheets

(56) References Cited

U.S. PATENT DOCUMENTS

2012/0293620 A1* 11/2012 Pahalawatta ......... H04N 19/597
    348/43
2017/0024840 A1* 1/2017 Holub ................... G06T 1/0028

OTHER PUBLICATIONS

Khanzode, P., et al., "Digital Watermarking for Protection of Intellectual Property," IJCEM, vol. 12, Apr. 2011, 5 pages.
Sonnet, H., et al., "Illustration Watermarks for Vector Graphics," IEEE, 11th Pacific Conference on Computer Graphics and Applications, Oct. 2003, 10 pages.

* cited by examiner

SYSTEMS AND METHODS FOR WATERMARKING DIGITAL IMAGES

BACKGROUND

Technical Field

The present disclosure relates to watermarking digital images.

Description of the Related Art

Watermarking digital images provides operators with an ability to secure the information contained within the images. For example, watermarking may be used to protect the digital image from tampering, to provide copyright protections, and/or to provide digital rights management controls over the digital image. Such watermarks may be discretely embedded within the digital image, and may be used to indicate the origins and/or recipient of the digital image.

BRIEF SUMMARY

Conventional watermarking may be used to incorporate outside data into the watermarked digital image. Such conventional watermarking, though, may suffer from drawbacks related to increased susceptibility to being comprised or removed. A watermarking process may be made more robust by providing for a cross-dependence between different areas, or regions of interest, identified within a digital image. As such, information from a first region of interest may be used to determine a first mark, and the first mark may then be encoded into a second region of interest. Similarly, information from the second region of interest may be used to determine a second mark, and the second mark may then be encoded into the first region of interest. Such a watermarking process may thereby create a cross dependence between the first region of interest and the second region of interest. In some implementations, the cross-dependence watermarking process may be made even more robust by using a one or more regions of interest that include coded information, such as a barcode symbol, a Quick Response code symbol, or some other one- or two-dimensional machine-readable symbol. Such a watermarking process may be applied to more than two regions of interest.

A method of creating a watermarked electronic image of an object from a digital representation of at least part of the object, the object including an outer surface that has coded information, the digital representation of the at least part of the object including an electronic representation of the coded information and an electronic representation of a first part of the outer surface of the object separate from the coded information, may be summarized as including: identifying a first region of interest within the digital representation, the first region of interest including the electronic representation of the coded information and comprising a first set of pixel data; identifying a second region of interest, the second region of interest including the electronic representation of the part of the outer surface of the object and comprising a second set of pixel data; determining a first descriptor within the first region of interest; determining a second descriptor within the second region of interest; encoding the first descriptor, the encoding of the first descriptor resulting in a first mark; encoding the second descriptor, the encoding of the second descriptor resulting in a second mark; and creating the watermarked electronic image by changing at least a portion of the first descriptor based upon the second mark and changing at least a portion of the second descriptor based upon the first mark.

The coded information may include machine readable symbols. The method may further include: capturing with an image sensor the digital representation of the at least part of the object. The changes to the at least portion of the first descriptor based upon the second mark may result in changes to at least some of the pixel data within the first set of pixel data and the changes to the at least a portion of the second descriptor based upon the first mark may result in changes to at least some of the pixel data within the second set of pixel data. The changes to the at least some of the pixel data within at least one of the first set of pixel data and the second set of pixel data may be imperceptible to a human. The first region of interest may be separate from the second region of interest. The at least portion of the first descriptor may be changed based at least in part on a first key. The first key may identify one or more locations within the first descriptor to encode the second mark. The at least portion of the second descriptor may be changed based at least in part on a second key. The second key may identify one or more locations within the second descriptor to encode the first mark. Determining the first descriptor may further include segmenting the first region of interest into one or more partitions. Determining the first descriptor may further include vectorizing at least one of the one or more partitions to describe one or more points and one or more lines within the at least one of the one or more partitions. The encoded information may further include text information.

A method of detecting differences between a digital representation of at least part of an outer surface of an object and an associated watermarked electronic image, the object including an outer surface that has coded information, the digital representation which includes a first electronic representation of a first original region of interest related to the coded information and a second electronic representation of a second original region of interest related to a part of the outer surface of the object separate from the coded information, the watermarked electronic image having been created during a first period of time by determining a first original descriptor and first original mark related to the first original region of interest, determining a second original descriptor and second original mark related to the second original region of interest, and incorporating the first original mark into the second original descriptor to create a modified second region of interest and incorporating the second original mark into the first original descriptor to create a modified first region of interest may be summarized as including: identifying during a second period of time the modified first region of interest within the watermarked electronic image, the modified first region of interest including the first electronic representation of the coded information, the second period of time later than the first period of time; identifying during the second period of time the modified second region of interest within the watermarked electronic image, the modified second region of interest including the second electronic representation of the part of the outer surface of the object; determining a first marked descriptor from the modified first region of interest identified during the second period of time; determining a second marked descriptor from the modified second region of interest identified during the second period of time; attempting to retrieve a second extracted mark from the first marked descriptor; attempting to retrieve a first extracted mark from the second marked descriptor; comparing the first extracted mark to the first original mark, and if the first extracted mark does not equal the first original mark: determining the second original descriptor based on one of the second extracted mark and the second original mark; and comparing the second original descriptor to the second marked descriptor to identify modifications within the modified second region of interest of the watermarked electronic image received at the second point in time; and comparing the second extracted mark to the second original mark, and if the second extracted mark does not equal the second original mark: determining the first original descriptor based on one of the first extracted mark and the first original mark; and comparing the first original descriptor to the first marked descriptor to identify modifications within the modified first region of interest of the watermarked electronic image received at the second point in time.

The coded information may include machine readable symbols. Identifying the modified first region of interest during the second period of time may further include receiving coordinate information related to the first original region of interest. Identifying the modified first region of interest during the second period of time may further include extracting from the modified second region of interest coordinate information related to the first original region of interest. The first extracted mark may be retrieved from the second marked descriptor based at least in part on a first key. The modified first region of interest may be separate from the modified second region of interest during the second period of time. Determining the first marked descriptor may further include segmenting the modified first region of interest identified during the second period of time into one or more partitions. Determining the first marked descriptor may further include vectorizing at least one of the one or more partitions to describe one or more points and one or more lines within the at least one of the one or more partitions.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations. Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
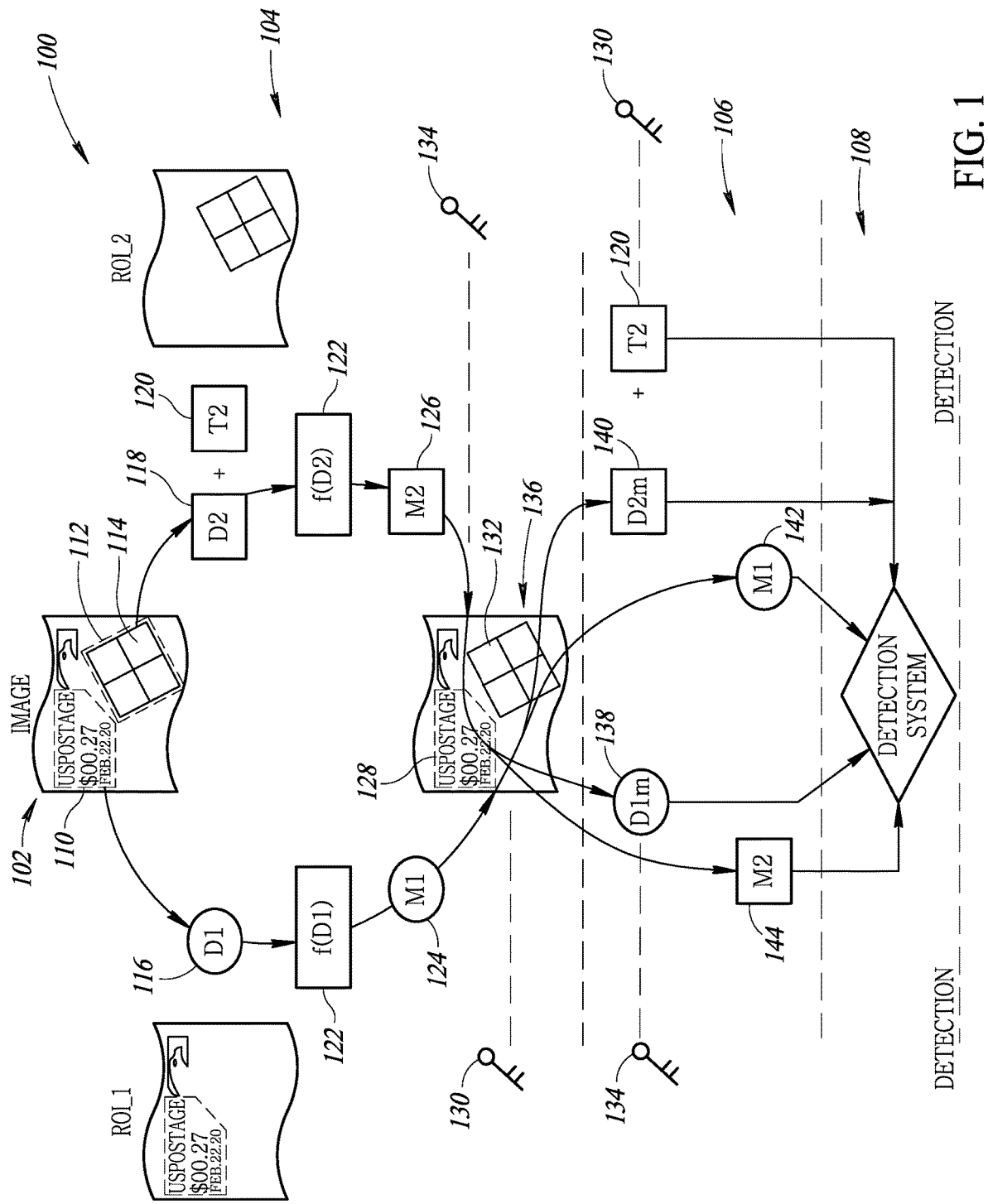
FIG. 1 is a flow diagram of a watermarking method that may be used to incorporate cross-dependent marks into an electronic representation of an object, according to one illustrated implementation.

FIG. 1 shows a watermarking method 100, which may be used to incorporate cross-dependent marks into an electronic or digital representation 102 of an object. The watermarking method 100 may include an encoding and insertion sub-process 104 that may be used to encode and insert one or more marks into the electronic or digital representation 102 at a first point in time, an extraction sub-process 106 that may be used to extract one or more of the marks at a second point in time, and a detection sub-process 108 that may be used to determine if any modifications have been made to the electronic or digital representation 102.

During the encoding and insertion sub-process 104, at least a first original region of interest 110 and a second original region of interest 112 may be identified within the electronic or digital representation 102 of the object. Each region of interest may correspond to a portion of the electronic or digital representation 102 of the object. In some implementations, such regions of interest may be non-overlapping regions or sectors of the electronic or digital representation 102 of the object. Although two regions of interest are shown as part of the watermarking method 100, more than two regions of interest may be identified by the encoding and insertion sub-process 104.

In some implementations, the first original region of interest 110 and/or the second original region of interest 112 may be determined based on one or more factors. For example, in some implementations, regions of interest may be selected based upon an amount, level, or type of detail within a region of interest. In some implementations, for example, the first original region of interest 110 may be selected based on the amount and level of detail within the first original region of interest 110 as compared to the remaining portions of the electronic or digital representation 102 of the object. In some implementations, a region of interest may be identified using an auto identification program (e.g., a machine-readable symbol decoding library) that may be used to identify regions containing coded information 114. Such an implementation may be used to identify, for example, the second original region of interest 112, which may include an electronic or digital representation of coded information 114. Such coded information 114 may include, for example, machine-readable symbols such as one-dimensional barcode symbols, two-dimensional machine-readable symbols (e.g. quick response (QR) code symbols, and other machine-readable symbols.

After identifying the first original region of interest 110 and/or the second original region of interest 112, the encoding and insertion sub-process 104 may determine descriptors for each of the regions of interest. For example, the first original region of interest 110 may be associated with a first original descriptor 116, and the second original region of interest 112 may be associated with a second original descriptor 118. In addition, because the second original region of interest 112 includes coded information 114, the second original region of interest 112 may also be associated with a text string 120. Such text string 120 may be the human-readable text that is encoded within the coded information 114. The text string 120 may be associated with the second original descriptor 118. Each of the first original descriptor 116 and the second original descriptor 118 may include a set of values (e.g., coordinates, functions) that may be used to identify one or more points and/or one or more lines within the first original region of interest 110 and the second original region of interest 112, respectively. In some implementations, such lines may be straight lines or curved lines. Such point and/or lines may correspond to visual features contained within the respective regions of interest.

Once the descriptors (e.g., the first original descriptor 116 and the second original descriptor 118) have been identified, the encoding and insertion sub-process 104 may apply an encoding function 122 to each of the descriptors to determine associated marks. For example, as shown in FIG. 1, the encoding function 122 may be applied to the first original descriptor 116 to determine the first original mark 124, and the encoding function 122 may be applied to the second original descriptor 118 to determine the second original mark 126. In some implementations, the encoding function 122 may determine the marks by using a hash or some other function that maps a descriptor (e.g., a plurality of functions, coordinates, and values) into a byte string of a specified length. In some implementations, the encoding function 122 may determine a mark by selecting a subset of the coordinates, functions, and other values that comprise the associated descriptor, and applying a hash or a similar such function to the selected subset of values. For example, the encoding function 122 may determine the first original mark 124 by selecting a subset of the coordinates, functions, and/or other values that comprise the first original descriptor 116, and applying a hash function to the subset of selected values. The encoding function 122 may determine the second original mark 126 by selecting a subset of the coordinates, functions, and/or other values that comprise the second original descriptor 118, and applying a hash to the subset of selected values.

The encoding and insertion sub-process 104 may use the various marks (e.g., the first original mark 124 and the second original mark 126) to create cross dependencies within a watermarked image by incorporating the various marks into the various, previously identified regions of interest (e.g., the first original region of interest 110 and/or the second original region of interest 112). For example, the encoding and insertion sub-process 104 may encode information related to the first original mark 124 and incorporate the encoded information into the second original region of interest 112, for example, by incorporating one or more symbols into the second original region of interest 112 or by modifying some of the visual data associated with the second original region of interest 112 based on the first original mark 124, as discussed below. In some implementations, a first key 130 may be used to encode the first original mark 124 into the second original descriptor 118 and to thereby incorporate the encoded information into the second original region of interest 112. The first key 130 may, for example, specify locations and/or redundancies for the encoded information from the first original mark 124 to be incorporated into the second original region of interest 112. Such modifications to the second original region of interest 112 may result in a modified second region of interest 132.

The encoding and insertion sub-process 104 may likewise or alternatively encode information related to the second original mark 126 into the first original descriptor 116 and to thereby incorporate the encoded information into the first original region of interest 110, for example, by incorporating one or more symbols into the first original region of interest 110 or by modifying some of the visual data associated with the first original region of interest 110 based on the second original mark 126. In some implementations, a second key 134 may be used to encode the second original mark 126 and/or to incorporate the encoded information into the first original region of interest 110, as discussed below. The second key 134 may, for example, specify locations and/or redundancies for the encoded information from the second original mark 126 to be incorporated into the first original region of interest 110. The second key 134 can, for example, be different from the first key 130. Such modifications to the first original region of interest 110 may result in a modified first region of interest 128.

Modifications within each of the first original region of interest 110 and the second original region of interest 112 may involve slightly modifying a set of values (e.g., coordinates, functions) used to identify one or more points and/or one or more lines within the first original region of interest 110 and the second original region of interest 112, respectively. In some implementations, such lines may be straight lines or curved lines. This results in modifying some image's pixels relative to first original descriptor 116 and second original descriptor 118, but the change is minimal so that the modified regions of interest may be segmented, as discussed below. While a portion of the set of pixels composing each of the original regions of interest 110, 112 associated with each of the original descriptors 116, 118 are changed after the insertion of watermarks, the data string encoding the first original descriptor 116 and the second original descriptor 118 in the respective regions of interest are not changed for the purpose of segmenting the modified regions of interest.

The modified first region of interest 128 and/or the modified second region of interest 132 may be incorporated into the electronic or digital representation 102 of the object to form a watermarked image 136 at a first point in time. The watermarked image 136 may thereby include cross-dependencies between the first original region of interest 110 and the second original region of interest 112. Although two regions of interest and two marks are shown in FIG. 1, such a sub-process is not so limited and may be performed with a plurality N regions of interest and associated marks. The marks (e.g., the first original mark 124 and/or the second original mark 126) may be saved for later use within the watermarking method 100. The watermarked image 136 may be stored in one or more non-transitory computer- or processor-readable media, and, or, represented in visual representations, whether in visible or non-visible (e.g, infrared, ultraviolet) portions of the electromagnetic spectrum, and thus may or may not be discernable to humans, respectfully, without the aid of a sensor or machine.

The extraction sub-process 106 may be performed on the watermarked image 136 at a later, second point in time. The extraction sub-process 106 may identify the modified first region of interest 128 and/or the modified second region of interest 132 within the watermarked image 136. Once the modified regions of interest are identified, the extraction sub-process 106 may determine the marked descriptors associated with each of the identified, modified regions of interest. The extraction sub-process 106 may use the same procedures and techniques to identify the marked descriptors as the encoding and insertion sub-process 104 used to determine the first original descriptor 116 and the second original descriptor 118. As such, the extraction sub-process 106 may identify a first marked descriptor 138 associated with the modified first region of interest 128. The extraction portion may identify a second marked descriptor 140 associated with the modified second region of interest 132. The extraction sub-process 106 may additionally identify and decode the text string 120 within the coded information 114 shown in the modified second region of interest 132.

Once the marked descriptors (e.g., the first marked descriptor 138 and/or the second marked descriptor 140) have been identified, the extraction sub-process 106 may use the marked descriptors and keys to extract the marks encoded within the modified regions of interest (e.g., modified first region of interest 128 and/or modified second region of interest 132). For example, in some implementations, the extraction sub-process 106 may use the first key 130 to extract a first extracted mark 142 from the second marked descriptor 140. The extraction sub-process 106 may use the second key 134 to extract a second extracted mark 144 from the modified first region of interest 128. The extraction sub-process 106 may provide the extracted marks (e.g., first extracted mark 142 and/or second extracted mark 144) as well as the marked descriptors (e.g., first marked descriptor 138 and/or second marked descriptor 140) to the detection sub-process 108.

The detection sub-process 108 may be used to determine if the watermarked image 136 (e.g., as stored in electronic or digital form) was tampered with between the first point in time in which the watermarked image 136 was created and the second point in time in which the marked descriptors and extracted marks were determined. As such, the detection sub-process 108 may compare the first original mark 124 determined during the encoding and insertion sub-process 104 with the first extracted mark 142 to determine if the first original mark 124 equals the first extracted mark 142. If the first original mark 124 equals the first extracted mark 142, then the detection sub-process 108 determines that the second original region of interest 112 was not tampered with or changed between the first point in time and the second point in time. If the first original mark 124 does not equal the first extracted mark 142, then the detection sub-process 108 determines that the second original region of interest 112 was tampered with or changed between the first point in time and the second point in time. To identify the changes, the detection sub-process 108 may compare the second marked descriptor 140 with the second original descriptor 118 to identify differences. In some implementations, for examples, differences between the second marked descriptor 140 with the second original descriptor 118 not attributable to the first original mark 124 may be attributable to tampering or other unauthorized or unwanted changes.

In some implementations, the detection sub-process 108 may compare the second original mark 126 determined during the encoding and insertion sub-process 104 with the second extracted mark 144 to determine if the second original mark 126 equals the second extracted mark 144. If the second original mark 126 equals the second extracted mark 144, then the detection sub-process 108 determines that the first original region of interest 110 was not tampered with or changed between the first point in time and the second point in time. If the second original mark 126 does not equal the second extracted mark 144, then the detection sub-process 108 determines that the first original region of interest 110 was tampered with or changed between the first point in time and the second point in time. To identify the changes, the detection sub-process 108 may compare the first marked descriptor 138 with the first original descriptor 116 to identify differences. In some implementations, for examples, differences between the first marked descriptor 138 with the first original descriptor 116 not attributable to the second original mark 126 may be attributable to tampering or other unauthorized or unwanted changes.

Figure 2:
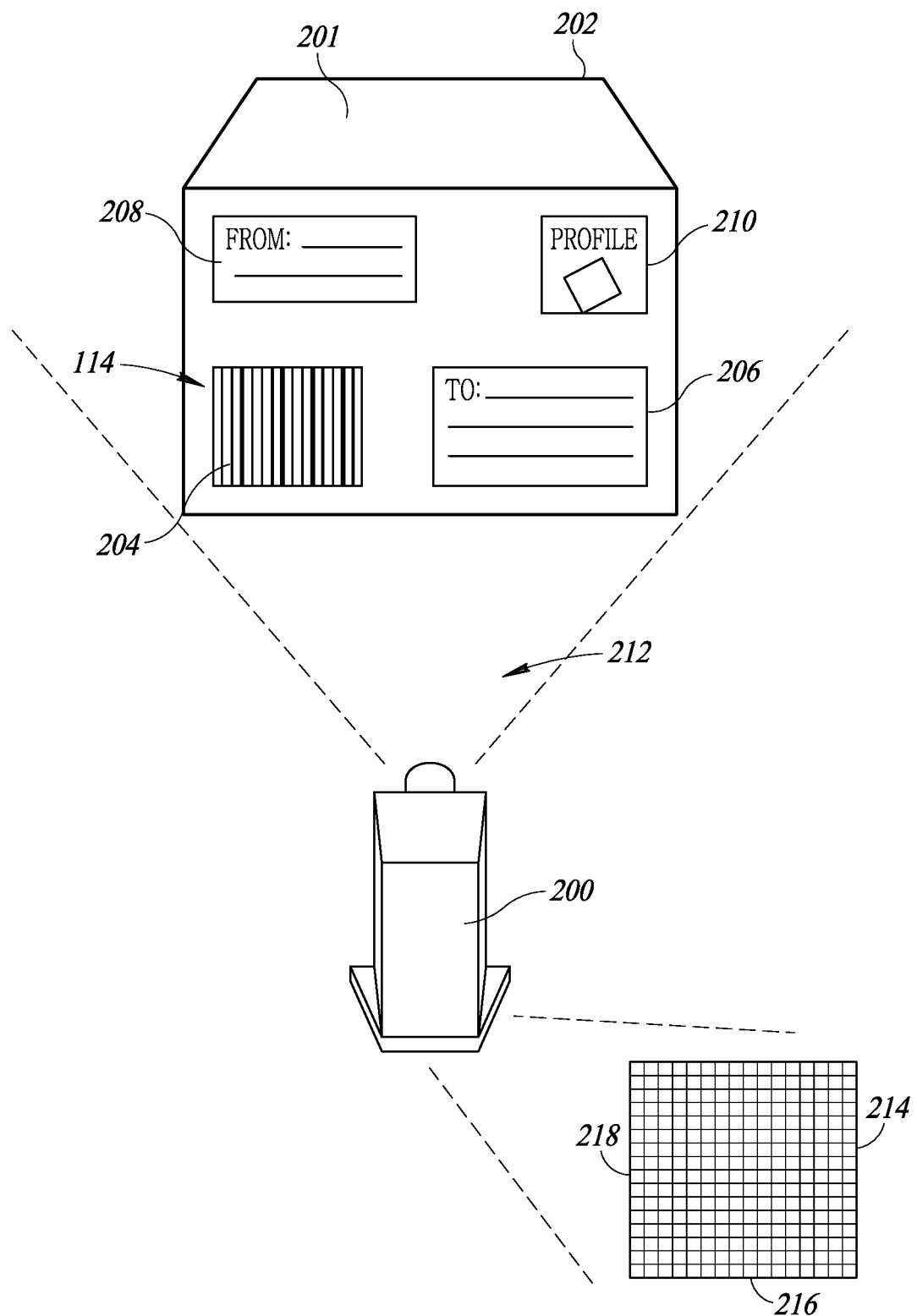
FIG. 2 is an isometric view of a machine-readable symbol reader and an object in which the machine-readable symbol reader is capturing one or more digital images of the object, according to one illustrated implementation.

FIG. 2 shows a machine-readable symbol reader 200 and an object 202 in which the machine-readable symbol reader 200 is capturing one or more images of the object 202. The object 202 may have an outer surface 201 that includes coded information 114 in the form of a machine-readable symbol 204 (e.g., a Quick Response code symbol, Data Matrix symbol, PDF417 symbol). The object 202 may also include a shipping address label 206, a return address label 208, and a postage symbol 210. In some implementations, one or more of the machine readable symbol 204, the shipping address label 206, the return address label 208, and/or the postage symbol 210 may be captured as a region of interest by the watermarking method 100.

In some implementations, the machine-readable symbol reader 200 may include a field of view 212 that may be used to capture electronic representations of objects (e.g., the object 202) within the field of view 212. Such an electronic representation may be captured, for example, using an array of transducers (e.g., charge-coupled devices (CCDs), photodiode(s), CMOS image sensor) that may provide voltage or other electrical signals representative of light and/or color information present in at least a portion of the field of view 212 of the machine-readable symbol reader 200. The machine-readable symbol reader may capture and store such data from each of the transducers in the array of transducers in order to provide an electronic or digital representation of the portion of the object 202 within the field of view 212. In some implementations, the captured electronic or digital representation may be stored and processed within the machine-readable symbol reader 200 as an array of pixels 214 in which each of the pixels within the array of pixels may be identified using coordinates along an x-axis 216 and a y-axis 218. As such, the machine-readable symbol reader may be capable of performing one or more of the encoding and insertion sub-process 104, the extraction sub-process 106, and the detection sub-process 108 at different points in time. Alternatively, or in addition, the machine-readable symbol reader may be communicatively coupled (such as, for example, through a communications network) to one or more processor-controlled devices that may be capable of performing one or more of the encoding and insertion sub-process 104, the extraction sub-process 106, and the detection sub-process 108 at different points in time.

Figure 3:
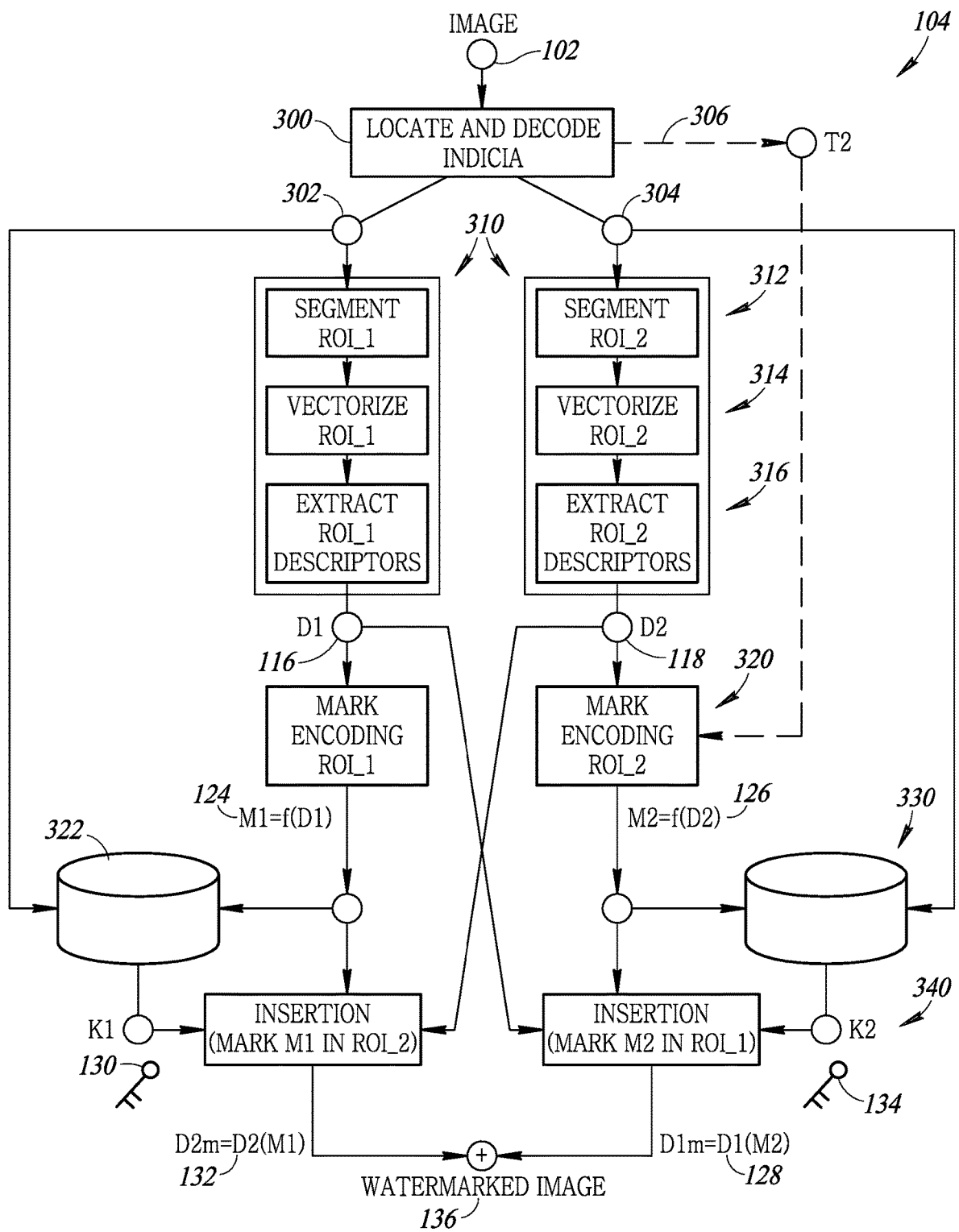
FIG. 3 is a flow diagram of an encoding and insertion sub-process that may be used as part of the watermarking method shown in FIG. 1, according to at least one illustrated implementation.

FIG. 3 shows the encoding and insertion sub-process 104, according to at least one illustrated implementation. At 300, regions of interest within the electronic or digital representation 102 of a portion of the object 202 are located. Such regions of interest may correspond to a set of pixel data from the array of pixels 214 that form the electronic or digital representation 102 of the portion of the object 202. In some implementations, such regions of interest may be identified and located using an auto-identification algorithm, such as any number of machine-readable symbol (e.g., barcode or Quick Response code symbols) identification algorithms (e.g., barcode decoding by means of pattern classification, statistical algorithms, pattern matching algorithms, artificial neural networks and similar) that may be present in a machine-readable symbol decoding library for one or more machine-readable symbologies. As such, one or more of the regions of interest may include coded information, in which text or other data is represented, for example, in an encoded format such as encoded in a barcode symbol, a Quick Response code symbol, a Data Matrix symbol, or some other representation used to visually encode data. Such encoded data may be decoded at 300 to form a text string. Although the implementation shown in FIGS. 1 and 3 include coded information 114 encoded for example into barcode and/or Quick Response code symbols, the techniques described herein may be used on electronic or digital representations 102 that include regions of interest that do not have coded information 114. Including at least region of interest that has coded information 114 within an electronic or digital representation 102, however, may provide for a more robust watermarking method 100 because the region of interest containing the coded information 114 may be more easily identifiable. In some implementations, coded information 114 may be added to an electronic or digital representation 102 to make the watermarking method 100 more robust for the reasons described.

As shown in FIG. 3, the output from 300 may include first ROI information 302 regarding the first original region of interest 110 and second ROI information 304 regarding the second original region of interest 112. Such ROI information may include, for example, coordinates that may be used to locate the respective regions of interest within the electronic or digital representation 102 of the portion of the object 202. In some implementations, the second original region of interest 112 may include information (e.g., data, text, values) that has been encoded into the coded information 114. Such coded information 114 may be decoded at 300 as second ROI text string 306. The first ROI information 302, the second ROI information 304, and the second ROI text string 306 are output from 300.

At 310, descriptors are determined for each of the regions of interest (e.g., the first original region of interest 110 and the second original region of interest 112) identified in 300. As such, 310 may include techniques for segmentation 312, vectorization 314, and/or extraction 316 for each of the regions of interest. The segmentation sub-process 312 may include techniques for segmenting the respective regions of interest into one or more partitions or segments. In some implementations, such partitions may be determined using any number of techniques. For example, one or more of a watershed (e.g., flood-fill) technique, maximally stable extremal regions (MSER) technique, a region growing technique, and a GrabCut/graph cuts (e.g., OpenCV's implementation) sub-process may be used to segment each of the regions of interest into different partitions. Such techniques may result in the regions of interest being decomposed into a set of one or more closed partitions or segments, each of which may be delimited by one or more boundaries such as lines and/or curves. Advantageously, the segmentation sub-process 312 may be performed in the spatial domain and/or the frequency domain using, for example, a Fourier, discrete-cosine, or any similar such frequency domain transfer function.

The segmentation sub-process 312 may access the first original region of interest 110 using the first ROI information 302, and segment the first original region of interest 110 into a plurality of partitions using one or more segmentation techniques. The segmentation sub-process 312 may access the second original region of interest 112 using the second ROI information 304, and segment the second original region of interest 112 into a plurality of partitions using one or more segmentation techniques. Each of the partitions from the first original region of interest 110 and/or the second original region of interest 112 may be provided to the vectorization sub-process 314.

The vectorization sub-process 314 may accept the partitioned regions of interest, and provide coordinates, equations, or other data to identify one or more of the points, lines, curves or other edges that form part of at least one of the partitions identified as a result of the segmentation sub-process 312. The vectorization sub-process 314 may be used to obtain descriptions of each of the various identified edges or other elements. Such descriptions may include coordinates that specify a location within the electronic or digital representation 102 of the portion of the object 202. In some implementations, such lines, edges, and shapes may be represented by one or more equations. As shown in FIG. 3, the vectorization sub-process 314 may be used to describe each of the lines and other edges associated with each of the partitions identified within the first original region of interest 110 and/or the second original region of interest 112 during the segmentation sub-process 312.

The extraction sub-process 316 may be used to collect the descriptions of each of the points, lines, and other edges identified during the vectorization sub-process 314. As such, in some implementations, the extraction sub-process 316 may collect such descriptions and organize such descriptions to form one or more closed partitions within each of the regions of interest. In some implementations, the closed partitions identified as part of the extraction sub-process 316 and specified through descriptions of one or more lines, edges, or shapes, may correspond to the partitions identified as part of the segmentation sub-process 312.

The set of descriptions collected during the extraction sub-process 316 may form the descriptors associated with each of the regions of interest. For example, as shown in FIG. 3, the extraction sub-process 316 may collect the descriptions of each of the various lines and edges within the first original region of interest 110, and may group such descriptions together to identify a plurality of closed partitions within the first original region of interest 110. The extraction sub-process 316 may output the grouped set of descriptions as the first original descriptor 116. Similarly, the extraction sub-process 316 may collect the descriptions of each of the various lines and edges within the second original region of interest 112, and may group such descriptions together identify a plurality of closed partitions within the second original region of interest 112. The extraction sub-process 316 may output the grouped set of descriptions as the second original descriptor 118. The first original descriptor 116 and the second original descriptor 118 may be provided to an encoding sub-process 320.

At the encoding sub-process 320, the descriptors output by the extraction sub-process 316 may be used to create one or more marks that may be used to create the modified, watermarked image 136. In some implementations, for example, the encoding sub-process 320 may include a hash function, or some similar such function, that may be used to create a mark that comprises a unique bit string of a specified length (e.g., 8-bits) based upon one or more descriptors that are input into the hash function. As shown in FIG. 3, for example, the extraction sub-process 316 may apply a hash function to each of the first original descriptor 116 and the second original descriptor 118 to determine a first original mark 124 and a second original mark 126, respectively, each of a specified length. In some implementations, the second ROI text string 306 is also used by the encoding sub-process 320 when encoding the second original descriptor 118. In some implementations, for example, the second ROI text string 306 may be passed (e.g., ASCII-binary format) as an input to the hash function applied to the first original descriptor 116 and/or the second original descriptor 118. In other implementations, the second ROI text string 306 may be used to modify the first original descriptor 116 and/or the second original descriptor 118 before applying the encoding sub-process 320.

At 330, each of the first original mark 124 and the second original mark 126 may be stored within a computer memory 322 to be accessed during the watermarking method 100. The first ROI information 302 and the second ROI information 304, which may include, for example, location information that specifies the location of each region of interest within the electronic representation of the object 202, may further be saved at 330 within the computer memory 322. The electronic representation of the object 202 need not be saved.

An insertion sub-process 340 may be used to insert each of the marks determined by the encoding sub-process 320 into one or more regions of interest. In some implementations, for example, the insertion sub-process 340 may modify one or more of the descriptors associated with one of the regions of interest and identified during the segmentation sub-process 312 and vectorization sub-process 314. Such modifications may be based upon one or more of the determined marks. In some implementations, the modifications to a descriptor may include changes to one or more of the lines, curves, or other edges that may form one of the features of the descriptor, as described below. In some implementations, such changes to the descriptors may result in modifying the electronic or digital representation 102 of the portion of the object 202 to form the watermarked image 136. In some implementations, such changes may be imperceptible to an unaided human eye, and thus may result in little to no degradation of the image quality to a viewer. In some implementations, the insertion sub-process 340 may insert a determined mark into multiple locations within a descriptor to provide redundancy for the mark.

In some implementations, the insertion sub-process 340 may use a key that may provide information to be used to insert the mark into the descriptors. Such a key may, for example, specify one or more locations for the mark to be incorporated, a redundancy factor (e.g., the number of times a mark is to be incorporated into a descriptor), the type of encoding to be used, and other such information that may be used to encode the mark into the descriptor. Such a key may be kept private to protect the locations and redundancies for inserting the marks into the descriptors.

As shown in FIG. 3, the insertion sub-process 340 may be used to insert the first original mark 124 into the second original descriptor 118 using the first key 130 to create the modified second region of interest 132. The insertion sub-process 340 may be used to insert the second original mark 126 into the first original descriptor 116 using the second key 134 to create the modified first region of interest 128. The insertion sub-process 340 may insert one or both of the modified first region of interest 128 and the modified second region of interest 132 into the electronic or digital representation 102 of the portion of the object 202 to create the watermarked image 136. Although FIG. 3 shows two regions of interest and two marks, the encoding and insertion sub-process 104 may be applied to any number of regions of interest and marks. As such, in some implementations, one or more of the marks may be inserted into multiple regions of interest. In some implementations, one or more of the descriptors may be modified using a plurality of marks. In such an implementation, such modifications from each of the marks may be encoded into different and/or overlapping sections of the modified descriptor.

Figure 4:
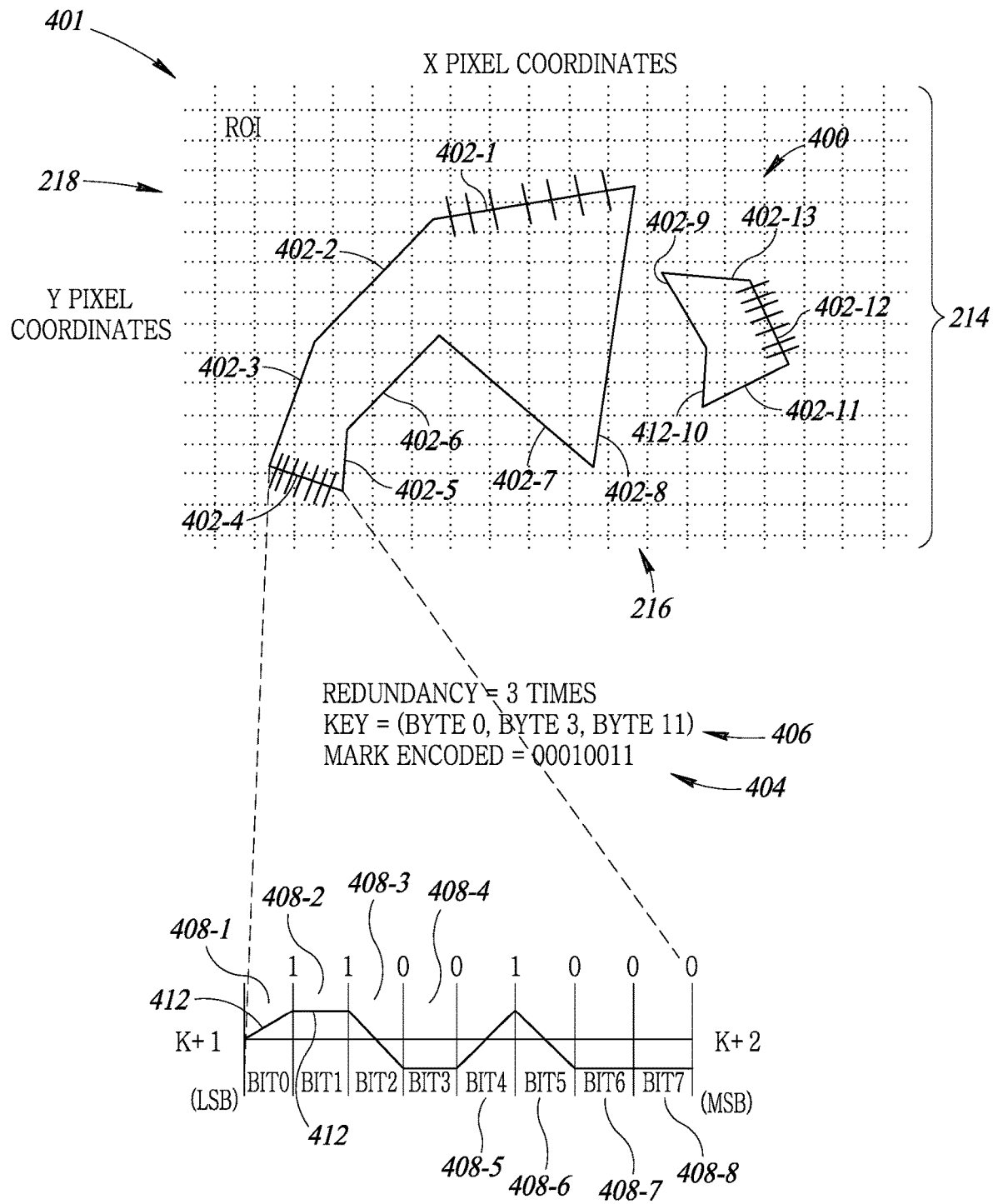
FIG. 4 is a schematic diagram showing a first descriptor within a first region of interest that has been modified by a second mark associated with a second region of interest, according to at least one illustrated implementation.

FIG. 4 shows an example in which a first descriptor 400 within a first region of interest 401 has been modified by a second mark 404 associated with a second region of interest (not shown). The second mark 404 may include eight bits of data corresponding to "00010011." A first key 406 may be used to encode the second mark 404 into the first descriptor 400. The first descriptor 400 includes thirteen (13) straight edges 402 (identified as first edge 402-1 through thirteenth edge 402-13) that form two closed partitions, a first closed partition 408 and a second closed partition 410. Each of the straight edges 402-1 through 402-13 may be identified using coordinates related to the x-axis 216 and y-axis 218 of the array of pixels 214. The first key 406 may specify that the second mark 404 is to be encoded into the first edge 402-1 (corresponding to byte 0), the fourth edge 402-4 (corresponding to byte 3), and the twelfth edge 402-12 (corresponding to byte 11) of the first descriptor 400. As such, the first key 406 may specify a redundancy factor of three for the second mark 404.

To encode the second mark 404 into the first descriptor 400, each of the edges (the first edge 402-1, the fourth edge 402-4, and the twelfth edge 402-12) identified by the first key 406 may be equally divided into eight sections, partitions 408-1 through 408-8 (collectively, "partitions 408"), in which each partition 408-1 through 408-8 is associated with one corresponding bit from the second mark 404. In such an implementation, the right-hand side of each partition 408 may be displaced in a certain direction according to the value of the corresponding bit from the second mark 404 to be encoded within each partition 408. As shown in FIG. 4, for example, the location of each right-hand side of a partition 408 in the fourth edge 402-4 may be displaced in an upward direction to encode a "1" value, and the location of each right-hand side of a partition 408 in the fourth edge 402-4 may be displaced in a downward direction to encode a "0" value. In some implementations, the amount of displacement of a partition 408 may be expressed as a percentage (e.g., 5%) of the length of the edge 402 being displaced. In some implementations, the displacement of a partition 408 may be expressed as a percentage of another measurement associated with the set of edges 402 (e.g., 5% of the shortest/longest edge 402). As such, the displacement of the edges 402 may be advantageously imperceptible to an unaided human eye, and thus may cause no degradation to the image. In addition, the modifications to the edges 402 may be resistant to common signal distortions and intentional tampering due to the redundancy and minimal modifications to the image.

The right-hand sides for adjacent partition 408 may be connected by a straight line 412 (two identified). Accordingly, a single, straight-line edge 402 may be broken into lines 412 in order to encode the second mark 404. As such, each of the straight lines 412 may be angled in an upward direction (when moving from a "0" to a "1"), may be angled in a downward direction (when moving from a "1" to a "0"), or may be relatively straight (when moving from a "0" to a "0" or from a "1" to a "1"). In some implementations, such as when an edge is substantially vertical (e.g., twelfth edge 402-12), the displacement of each partition 408 of the edge may be in the rightward direction or leftward direction to encode a value (e.g., displacing a section towards the right to encode a "1" and to the left to encode a "0"). Because each of the first edge 402-1, the fourth edge 402-4, and the twelfth edge 402-12 may have a different length, the length of each of the partitions 408 across each of the edges may correspondingly vary. As shown in FIG. 4, for example, the sections for the first edge 402-1 may be longer than the sections for the fourth edge 402-4 because the first edge 402-1 is longer than the fourth edge 402-4.

Figure 5:
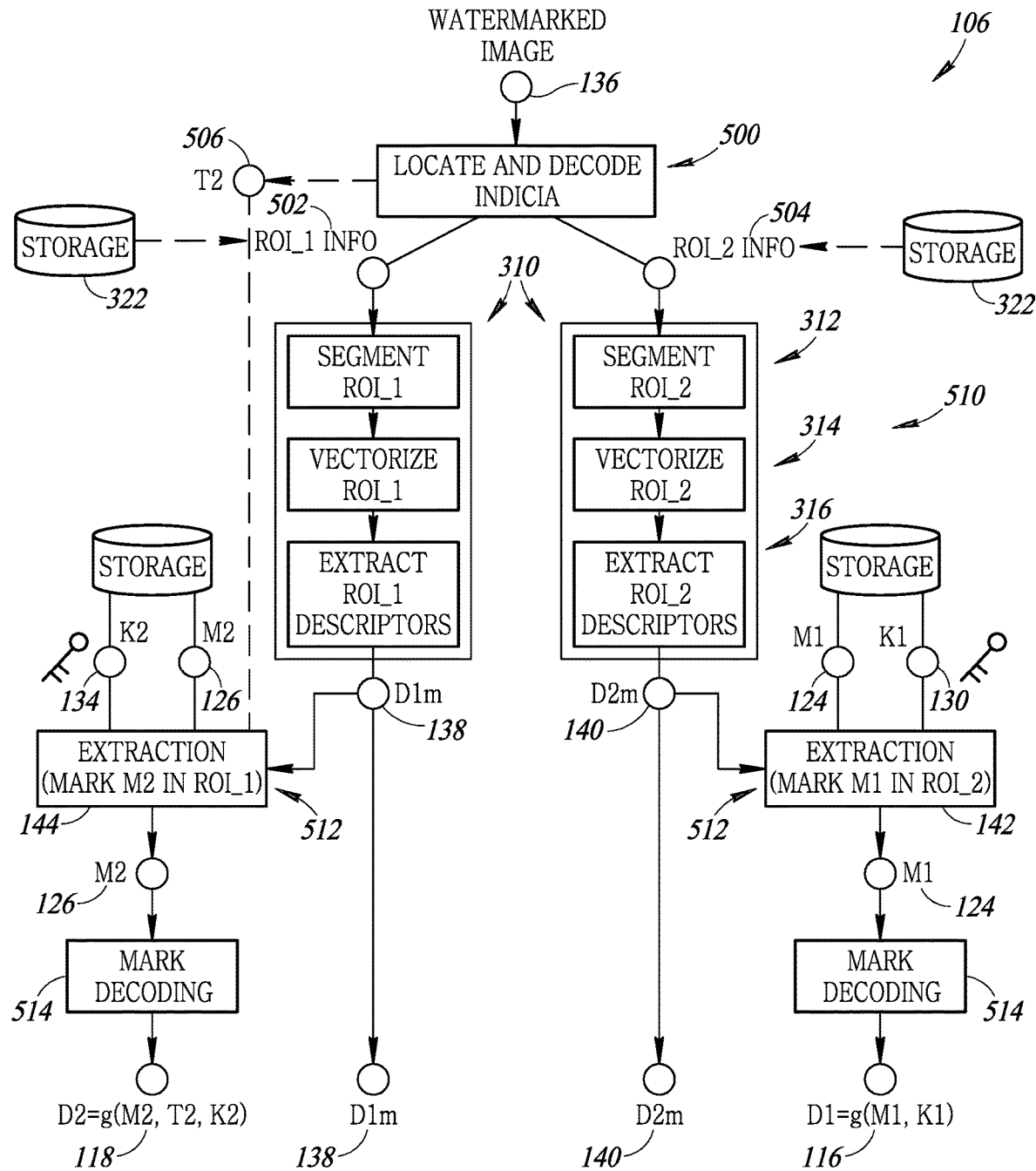
FIG. 5 is a flow diagram of an extraction sub-process that may be used as part of the watermarking method shown in FIG. 1, according to at least one illustrated implementation.

FIG. 5 shows the extraction sub-process 106, according to at least one illustrated implementation. In some implementations, the extraction sub-process 106 occurs at a second point in time after the marks (e.g., the first original mark 124 and the second original mark 126) have been incorporated into the electronic or digital representation 102 of the portion of the object 202. At 500, the regions of interest within the watermarked image 136 are located. Such regions of interest in the watermarked image 136 may correspond to the original regions of interest identified at 300 within the electronic or digital representation 102 of the portion of the object 202. As such, one or more of the regions of interest may include coded information that may be encoded, for example, using a barcode symbol, Quick Response code symbol, or some other representations that may be used to visually encode data. In such an implementation, the coded information may be decoded to form a text or data string. As shown in FIG. 5, two regions of interest, the modified first region of interest 128 and the modified second region of interest 132, are identified within the watermarked image 136 at 500. In addition, the text string 506 encoded within the coded information 114 (e.g., barcode symbol or Quick Response code symbol) present in the modified second region of interest 132 may be decoded at 500.

In some implementations, the processes and procedures used at 500 to identify the modified regions of interest may be the same as the processes and procedures used at 300 to identify the original regions of interest. As noted above, the modified regions of interest identified at 500 may correspond to the original regions of interest identified at 300. In some implementations, however, the visual quality of the watermarked image 136 has degraded to such an extent that the modified regions of interest cannot be identified at 500. In such an implementation, one or more of the first ROI information 302 and/or the second ROI information 304 may be retrieved from the computer memory 322. The first ROI information 302 stored within the computer memory 322 may be used to identify the locations of the modified first region of interest 128. The second ROI information 304 stored within the computer memory 322 may be used to identify the location of the modified second region of interest 132. The output from 500 may include first modified ROI information 502 regarding the modified first region of interest 128, second modified ROI information 504 regarding the modified second region of interest 132, and the text string 506. Such ROI information may include, for example, coordinates that may be used to locate the respective modified regions of interest within the watermarked image 136.

At 510, descriptors are determined for each of the modified regions of interest (e.g., the modified first region of interest 128 and the modified second region of interest 132) identified in 500. As such, 510 may include techniques for segmentation 312, vectorization 314, and/or extraction 316 for each of the modified regions of interest. In some implementations, the same segmentation sub-process 312, vectorization sub-process 314, and extraction sub-process 316 may be used during both the encoding and insertion sub-process 104 and the extraction sub-process 106. The segmentation sub-process 312 may include techniques for segmenting the respective modified regions of interest into one or more partitions or segments. In some implementations, such partitions may be determined using any number of techniques. For example, one or more of a watershed (e.g., flood-fill) technique, maximally stable extremal regions (MSER) technique, a region growing technique, and a GrabCut/graph cuts (e.g., OpenCV's implementation) sub-process may be used to segment each of the modified regions of interest into different partitions. Such techniques may result in the modified regions of interest being decomposed into a set of one or more closed partitions or segments, each of which may be delimited by one or more boundaries such as lines and/or curves. Advantageously, the segmentation sub-process 312 may be performed in the spatial domain and/or the frequency domain using, for example, a Fourier, discrete-cosine, or any similar such frequency domain transfer function.

The segmentation sub-process 312 may access the modified first region of interest 128 using the first modified ROI information 502, and segment the first original modified region of interest 128 into a plurality of partitions using one or more segmentation techniques. The segmentation sub-process 312 may access the modified second region of interest 132 using the second modified ROI information 504, and segment the modified second region of interest 132 into a plurality of partitions using one or more segmentation techniques. Each of the partitions from the modified first region of interest 128 and/or the modified second region of interest 132 may be provided to the vectorization sub-process 314.

The vectorization sub-process 314 may accept the partitioned modified regions of interest, and provide coordinates, equations, or other data to identify one or more of the points, lines, curves or other edges that form part of at least one of the partitions or segments identified as a result of the segmentation sub-process 312. The vectorization sub-process 314 may be used to obtain descriptions of each of the various identified edges or other elements. Such descriptions may include coordinates that specify a location within the watermarked image 136. In some implementations, such lines, edges, and shapes may be represented by one or more equations. As shown in FIG. 5, the vectorization sub-process 314 may be used to describe each of the lines and other edges associated with each of the partitions identified within the modified first region of interest 128 and/or the modified second region of interest 132 during the segmentation sub-process 312.

The extraction sub-process 316 may be used to collect the descriptions of each of the points, lines, and other edges identified during the vectorization sub-process 314. As such, in some implementations, the extraction sub-process 316 may collect such descriptions and organize such descriptions to form one or more closed partitions within each of the regions of interest. In some implementations, the closed partitions identified as part of the extraction sub-process 316 and specified through descriptions of one or more lines, edges, or shapes, may correspond to the partitions or segments identified as part of the segmentation sub-process 312.

The set of descriptions collected during the extraction sub-process 316 may form the descriptors associated with each of the regions of interest. For example, as shown in FIG. 5, the extraction sub-process 316 may collect the descriptions of each of the various lines and edges within the modified first region of interest 128, and may group such descriptions together to identify a plurality of closed partitions within the modified first region of interest 128. The extraction sub-process 316 may output the grouped set of descriptions as the first marked descriptor 138. Similarly, the extraction sub-process 316 may collect the descriptions of each of the various lines and edges within the modified second region of interest 132, and may group such descriptions together identify a plurality of closed partitions within the modified second region of interest 132. The extraction sub-process 316 may output the grouped set of descriptions as the second marked descriptor 140.

In some implementations, the first marked descriptor 138 and the second marked descriptor 140 may be input to a mark extraction sub-process 512. The mark extraction sub-process 512 may receive a marked descriptor and extract a mark that has been encoded within the marked descriptor. In some implementations, the mark extraction sub-process 512 may extract the encoded mark from a descriptor by using a key to identify the encoding locations for the marks within a marked descriptor, and then identifying the slight variations within the encoded locations to determine each of the bits that comprise the mark. As shown in FIG. 5, for example, the mark extraction sub-process 512 may receive the first marked descriptor 138 and use the second key 134 to identify the locations (e.g., the edges or segments) within the first marked descriptor 138 that have been encoded using the second original mark 126. Once the encoded locations within the first marked descriptor 138 have been identified, the mark extraction sub-process 512 may identify the slight variation within the encoded locations to determine the bit values for the encoded marker. These values may be used to determine the second extracted mark 144. The mark extraction sub-process 512 may further receive the second original mark 126 and pass the second original mark 126 to a mark decoding sub-process 514. Similarly, the mark extraction sub-process 512 may receive the second marked descriptor 140 and use the first key 130 to identify the locations (e.g., the edges or segments) within the second marked descriptor 140 that have been encoded using the first original mark 124. Once the encoded locations within the second marked descriptor 140 have been identified, the mark extraction sub-process 512 may identify the slight variation within the encoded locations to determine the bit values for the encoded marker. These values may be used to determine the first extracted mark 142. The mark extraction sub-process 512 may further receive the first original mark 124 and pass the first original mark 124 to the mark decoding sub-process 514.

The mark decoding sub-process 514 may receive as input a mark, a key, and optionally, a text string, and use the input to determine an associated descriptor. As such, the mark decoding sub-process 514 may be the inverse of the encoding function 122. Advantageously, the mark decoding sub-process 514 may be used to determine the descriptors associated with the original regions of interest 110, 112 of the electronic or digital representation 102 of the portion of the object 202 without saving or storing the original regions of interest 110, 112 or the electronic or digital representation 102. As shown in FIG. 5, the first original descriptor 116 may be determined by inputting the first original mark 124 and the first key 130 into the mark decoding sub-process 514. Likewise, the second original descriptor 118 may be determined by inputting the second original mark 126, the second key 134, and the text string 506 into the mark decoding sub-process 514. The extraction sub-process 106 may provide one or more of the first original descriptor 116, the second original descriptor 118, the first marked descriptor 138, the second marked descriptor 140, the first original mark 124, the second original mark 126, the first extracted mark 142, and the second extracted mark 144 to the detection sub-process 108.

Figure 6:
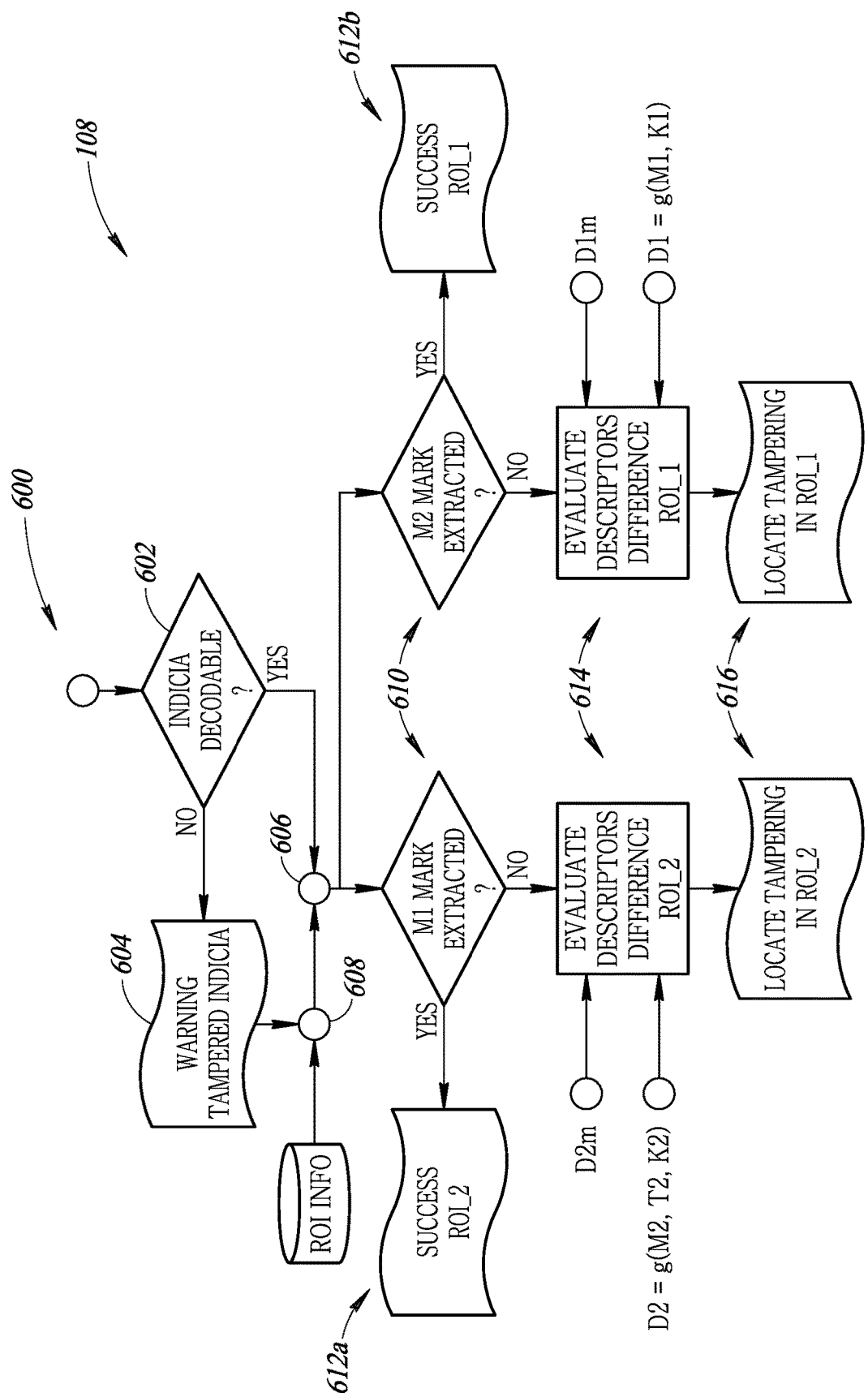
FIG. 6 is a flow diagram of a detection sub-process that may be used as part of the watermarking method shown in FIG. 1, according to at least one illustrated implementation.

FIG. 6 shows the detection sub-process 108, according to at least one illustrated implementation. At 600, the detection sub-process 108 receives one or more of the one or more of the first original descriptor 116, the second original descriptor 118, the first marked descriptor 138, the second marked descriptor 140, the first original mark 124, the second original mark 126, the first extracted mark 142, and the second extracted mark 144 from the extraction sub-process 106. At 602, the detection sub-process 108 determines if the coded information 114 included within the modified second region of interest 132 of the watermarked image 136 is decodable. If the coded information 114 is decodable, the detection sub-process 108 proceeds to 606 evaluate and compare the descriptors and the modified descriptors, as described below. If the coded information 114 is not decodable, then the detection sub-process 108 proceeds to 604 and determines that the watermarked image 136 has been modified and potentially tampered with. The detection sub-process 108 then proceeds to 608 in which it receives one or more values associated with the electronic or digital representation 102. Such information may include, for example, the first original mark 124 and the second original mark 126, which may be used to identify the differences in the watermarked image 136, as described below.

At 610, the detection sub-process determines if the mark extracted from a region of interest in the watermarked image 136 is the same as the corresponding mark encoded into the corresponding region of interest of the electronic or digital representation 102. For example, as shown in FIG. 6, at 610, the first extracted mark 142 is compared to the first original mark 124 to determine if the two marks are the same. If the two marks are the same, then the detection sub-process 108 moves to 612a and determines that the second region of interest 112 was not tampered with between a first point of time in which the first original mark 124 was incorporated into the electronic or digital representation 102 and a second point in time in which the watermarked image 136 was analyzed. If the two marks differ, then the detection sub-process 108 moves to 614 to identify the differences between the first extracted mark 142 and the first original mark 124.

Similarly, the detection sub-process 108, at 610, may compare the second extracted mark 144 to the second original mark 126 to determine if the two marks are the same. If the two marks are the same, then the detection sub-process 108 moves to 612b and determines that the modified first region of interest 128 was not tampered with between a first point of time in which the second original mark 126 was incorporated into the electronic or digital representation 102 and a second point in time in which the watermarked image 136 was analyzed. If the two marks differ, then the detection sub-process 108 moves to 614 to identify the differences between the second extracted mark 144 and the second original mark 126.

At 614, the detection sub-process 108 identified differences between descriptors incorporated into an electronic image and corresponding modified descriptors extracted from a watermarked image. In some implementations, the descriptors and modified descriptors may be considered as a time series. As such, dynamic time warping may be used to find the best alignment between a descriptor and a corresponding modified descriptor. Local areas in which alignment is not achieved may indicate areas that have been modified, such as may occur, for example, via tampering. Information related to the modified areas may then be recovered. As shown in FIG. 6, for example, the detection sub-process 108 at 614 may compare the second original descriptor 118 with the second marked descriptor 140 to identify differences and potential locations for tampering within the modified second region of interest 132 within the watermarked image 136. In some implementations, the second marked descriptor 140 may differ from the second original descriptor 118 based upon the first original mark 124. As such, the detection sub-process 108 may identify any further differences between the second original descriptor 118 and the second marked descriptor 140 that may not be attributable to the first original mark 124. Similarly, the detection sub-process 108 at 614 may compare the first original descriptor 116 with the first marked descriptor 138 to identify differences and potential locations for tampering within the modified first region of interest 128 within the watermarked image 136. In some implementations, the first marked descriptor 138 may differ from the first original descriptor 116 based upon the second original mark 126. As such, the detection sub-process 108 may identify any further differences between the first original descriptor 116 and the first marked descriptor 138 that may not be attributable to the second original mark 126. The detection sub-process 108 may then proceed to 616.

At 616, the differences between the descriptors and the marked descriptors may be used to identify locations in which the associated regions of interest may have been modified, changed, and/or tampered with. Such differences, for example, may be identified by comparing the various points, lines, and other edges associated with each of the descriptors and marked descriptors to determine the locations in which the points, lines, and other edges in the two marks do not overlap. For example, as shown at 616 in FIG. 6, the differences between the points, lines, and other edges that comprise the second original descriptor 118 and the points, lines, and other edges that comprise the second marked descriptor 140 are determined. Such differences may be used to identify those locations within the modified second region of interest 132 in the watermarked image 136 in which modifications and/or tampering may have occurred. Similarly, as shown at 616 in FIG. 6, the differences between the points, lines, and other edges that comprise the first original descriptor 116 and the points, lines, and other edges that comprise the first marked descriptor 138 are determined. Such differences may be used to identify those locations within the modified first region of interest 128 in the watermarked image 136 in which modifications and/or tampering may have occurred.

Figure 7:
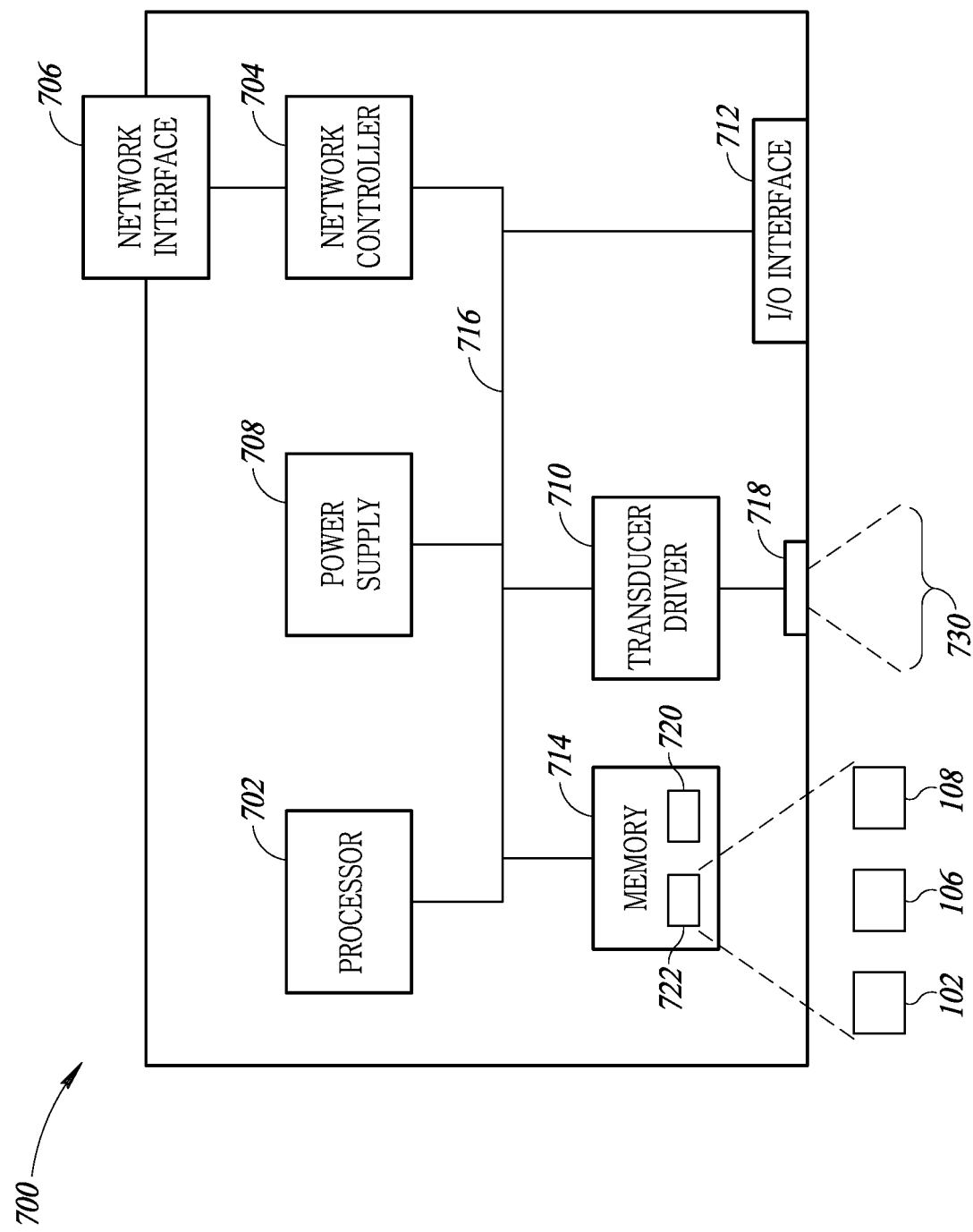
FIG. 7 is a block diagram of a control unit that may implement one or more techniques that comprise the watermarking method shown in FIG. 1, according to at least one illustrated implementation.

FIG. 7 shows a control unit 700 that may implement one or more techniques within the watermarking method 100, according to at least one illustrated implementation. The control unit 700 includes a processing unit 702, a network controller 704 and associated network interface 706, a power supply 708, a transducer driver 710, an input/output interface 712, and a system memory 714 (e.g., computer memory 322). Each of these components may be communicatively connected by bus(es) 716, which can provide bidirectional communication between the various components of the control unit 700. Bus(es) 716 may take, for example, the form of a plurality of buses (e.g., data buses, instruction buses, power buses) included in at least one body. The control unit 700 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80x86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 702 for the control unit 700 may be any logic processing unit, such as one or more central processing units (CPUs), digital signal processors (DSPs), application-specific integrated circuits (ASICs), field programmable gate arrays (FPGAs), etc. The power supply 708 for the control unit 700 may include one or more power supplies 708. The power supply 708 may be an internal power supply, such as a battery, energy source, fuel cell, or the like.

The control unit 700 may include a network controller 704 and associated network interface 706 to enable the control unit 700 to communicate with one or more communications or data networks. The network controller 704 may include one or more communications stacks to facilitate such network communication. Communications may be via the network interface 706 that includes a wired and/or a wireless network architecture to connect to, for instance, wired and wireless enterprise-wide computer networks, intranets, extranets, and/or the Internet. Other embodiments may include other types of communications networks including telecommunications networks, cellular networks, paging networks, and other mobile networks.

The control unit 700 may include one or more transducer drivers 710 that can be used to control one or more image sensors 718 that may be used to capture images or other information from the environment, such as, for example, those images that appear within an image-sensor field-of-view 730 of the image sensor 718. The control unit 700 may include one or more machine-readable symbol reader engines to optically read information from machine-readable symbols (e.g., one-dimensional or linear machine-readable symbols such as barcode symbols, two-dimensional machine-readable symbols, for instance Quick Response (QR) code symbols, or the like). Such an image sensor 718 and one or more machine-readable symbol reader engines may be available, for example, when the control unit 700 is incorporated into a machine-readably symbol reader or other such device. In some implementations, such an image sensor 718 and one or more machine-readable symbol reader engines may be available, for example, when the control unit 700 is incorporated into a smartphone that has a camera available to capture an image and associated applications that may be used to optically read information from captured machine-readable images.

The control unit 700 may include an input/output interface 712. Such an input/output interface 712 may provide an electrical and/or communicative coupling between the control unit 700 and various other input and output components or devices. Such components, for example, may include navigation and/or location tracking equipment and applications, and may provide, for example, geo-location functionality (e.g., GPS and/or GLONASS capabilities) that determines coordinate information, and/or positional functionality that determines or estimates relative location (e.g., location relative to one or more cellular towers) that may be used to provide an absolute and/or a relative position of the control unit 700.

The control unit 700 may include a system memory 714 that may comprise a hard disk drive (HDD) for reading from and writing to a hard disk, an optical disk drive for reading from and writing to removable optical disks, a magnetic disk drive for reading from and writing to magnetic disks, and/or a solid-state drive (SSD). The optical disk can be a CD-ROM, while the magnetic disk can be a magnetic floppy disk or diskette. The hard disk drive, optical disk drive, and magnetic disk drive may communicate with the processing unit 702 via the system bus 716. Those skilled in the relevant art will appreciate that other types of computer-readable media that can store data accessible by a computer may be employed, such as WORM drives, RAID drives, magnetic cassettes, flash memory cards, digital video disks ("DVD"), RAMs, ROMs, smart cards, etc.

System memory 714 can be used to store data 720 as well as one or more programs, applications, or routines 722. For example, the system memory 714 may store instructions for one or more of the encoding and insertion sub-process 104, the extraction sub-process 106, and/or the detection sub-process 108.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of creating a watermarked electronic image of an object from a digital representation of at least part of the object that is captured by an image sensor, the object including an outer surface that has machine-readable symbol information, the digital representation of the at least part of the object including an electronic representation of the machine-readable symbol information and an electronic representation of a first part of the outer surface of the object separate from the machine-readable symbol information, the method comprising:

identifying a first original region of interest within the digital representation, the first original region of interest comprising a first set of pixel data including the electronic representation of the machine-readable symbol information;

identifying a second original region of interest, the second original region of interest comprising a second set of pixel data including the electronic representation of the part of the outer surface of the object excluding the machine-readable symbol information;

determining a first descriptor within the first original region of interest;

determining a second descriptor within the second original region of interest;

encoding the first descriptor resulting in a first encoded mark;

encoding the second descriptor resulting in a second encoded mark; and creating the watermarked electronic image by:

changing at least a portion of the first original region of interest based upon the second encoded mark to create a first modified region of interest;

changing at least a portion of the second original region of interest based upon the first encoded mark to create a second modified region of interest; and incorporating the first modified region of interest and the second modified region of interest into the digital representation to form the watermarked electronic image having cross-dependencies between the first original region of interest and second original region of interest, wherein the cross-dependencies within the watermarked electronic image include the first modified region of interest being based upon the second encoded mark developed from the second descriptor within the second original region of interest, and the second modified region of interest being based upon the first encoded mark developed from the first descriptor within the first original region of interest.

2. The method of claim 1, further comprising:
capturing with an image sensor the digital representation of the at least part of the object.

3. The method of claim 1 wherein:
the changes to the at least portion of the first original region of interest based upon the second mark results in changes to at least some of the pixel data within the first set of pixel data; and
the changes to the at least portion of the second original region of interest based upon the first encoded mark results in changes to at least some of the pixel data within the second set of pixel data.

4. The method of claim 3 wherein the changes to the at least some of the pixel data within at least one of the first set of pixel data and the second set of pixel data are imperceptible to a human.

5. The method of claim 1 wherein the first original region of interest is separate from the second original region of interest.

6. The method of claim 1 wherein the at least portion of the first original region of interest is changed based at least in part on a first key.

7. The method of claim 6 wherein the first key identifies one or more locations relative to the first descriptor to encode the second descriptor resulting in the second encoded mark.

8. The method of claim 6 wherein the at least portion of the second original region of interest is changed based at least in part on a second key.

9. The method of claim 8 wherein the second key identifies one or more locations relative to the second descriptor to encode first descriptor resulting in the first encoded mark.

10. The method of claim 1 wherein determining the first descriptor further comprises segmenting the first original region of interest into one or more partitions.

11. The method of claim 10 wherein determining the first descriptor further comprises vectorizing at least one of the one or more partitions to describe one or more points and one or more lines within the at least one of the one or more partitions.

12. The method of claim 1 wherein the machine-readable symbol information further comprises text information.

13. The method of claim 1 wherein the machine-readable symbol information is selected from the group consisting of a barcode and a QR code.

14. A method of detecting differences between a digital representation of at least part of an outer surface of an object that is captured by an image sensor and an associated watermarked electronic image, the object including an outer surface that has machine-readable symbol information, the digital representation which includes a first electronic representation of a first original region of interest related to the machine-readable symbol information and a second electronic representation of a second original region of interest related to a part of the outer surface of the object separate from the machine-readable symbol information, the watermarked electronic image having been created during a first period of time by determining a first original descriptor and first original mark related to the first original region of interest, determining a second original descriptor and second original mark related to the second original region of interest, and incorporating the first original mark into the second original region of interest to create a modified second region of interest and incorporating the second original mark into the first original region of interest to create a modified first region of interest, the method comprising:
identifying during a second period of time the modified first region of interest within the watermarked electronic image, the modified first region of interest including the first electronic representation of the machine-readable symbol information, the second period of time later than the first period of time;
identifying during the second period of time the modified second region of interest within the watermarked electronic image, the modified second region of interest including the second electronic representation of the part of the outer surface of the object;
determining a first marked descriptor from the modified first region of interest identified during the second period of time;
determining a second marked descriptor from the modified second region of interest identified during the second period of time;
attempting to retrieve a second extracted mark from the first marked descriptor;
attempting to retrieve a first extracted mark from the second marked descriptor;
comparing the first extracted mark to the first original mark, and if the first extracted mark does not equal the first original mark:
determining the second original descriptor based on one of the second extracted mark and the second original mark; and
comparing the second original descriptor to the second marked descriptor to identify modifications within the modified second region of interest of the watermarked electronic image received at the second point in time; and
comparing the second extracted mark to the second original mark, and if the second extracted mark does not equal the second original mark:
determining the first original descriptor based on one of the first extracted mark and the first original mark; and
comparing the first original descriptor to the first marked descriptor to identify modifications within the modified first region of interest of the watermarked electronic image received at the second point in time.

15. The method of claim 14 wherein identifying the modified first region of interest during the second period of time further comprises receiving coordinate information related to the first original region of interest.

16. The method of claim 14 wherein identifying the modified first region of interest during the second period of time further comprises extracting from the modified second region of interest coordinate information related to the first original region of interest.

17. The method of claim 14 wherein the first extracted mark is retrieved from the second marked descriptor based at least in part on a first key.

18. The method of claim 14 wherein the modified first region of interest is separate from the modified second region of interest during the second period of time.

19. The method of claim 14 wherein determining the first marked descriptor further comprises segmenting the modified first region of interest identified during the second period of time into one or more partitions.

20. The method of claim 19 wherein determining the first marked descriptor further comprises vectorizing at least one of the one or more partitions to describe one or more points and one or more lines within the at least one of the one or more partitions.

21. A method of creating a watermarked electronic image of an object from a digital representation of at least part of the object is captured by an image sensor, the method comprising:

capturing with an image sensor the digital representation of the at least part of the object;

identifying a plurality of original regions of interest within the digital representation, each original region of interest comprising a set of pixel data, and at least one original region of interest including an electronic representation of the machine-readable symbol information;

determining a plurality of descriptors including a descriptor within the each original region of interest;

encoding each of the plurality of descriptors resulting in a plurality of corresponding encoded marks;

creating the watermarked electronic image by:

changing at least a portion of each original region of interest of the plurality based upon the an encoded mark derived from a descriptor associated with a different original regional of interest to create a plurality of different modified regions of interest; and incorporating each modified region of interest of the plurality into the digital representation to form the watermarked electronic image having cross-dependencies between the plurality of original regions of interest, wherein the cross-dependencies within the watermarked electronic image include each modified region of interest of the plurality being based upon different encoded marks developed from the descriptors within different original regions of interest.

\* \* \* \* \*